United States Patent
Shieh

(10) Patent No.: US 7,151,452 B2
(45) Date of Patent: Dec. 19, 2006

(54) VEHICLE OCCUPANT SENSING SYSTEM

(75) Inventor: Shiuh-An Shieh, Alpharetta, GA (US)

(73) Assignee: Elesys North America Inc., McDonough, GA (US)

( * ) Notice: Subject to any disclaimer, the term of this patent is extended or adjusted under 35 U.S.C. 154(b) by 393 days.

(21) Appl. No.: 10/729,655

(22) Filed: Dec. 5, 2003

(65) Prior Publication Data

US 2005/0121885 A1    Jun. 9, 2005

(51) Int. Cl.
*G08B 13/26* (2006.01)
(52) U.S. Cl. ............... 340/561; 340/666; 340/667; 340/668; 701/45; 701/46; 701/47
(58) Field of Classification Search ........... 340/561, 340/66, 667, 668, 666; 701/45, 46, 47
See application file for complete search history.

(56) References Cited

U.S. PATENT DOCUMENTS

| | | | |
|---|---|---|---|
| 3,943,376 A | 3/1976 | Long | |
| 4,625,329 A | 11/1986 | Ishikawa et al. | |
| 4,846,368 A | 7/1989 | Goetz | |
| 5,071,160 A | 12/1991 | White et al. | |
| 5,074,583 A | 12/1991 | Fujita et al. | |
| 5,118,134 A | 6/1992 | Mattes et al. | |
| 5,222,761 A | 6/1993 | Kaji et al. | |
| 5,231,253 A | 7/1993 | Breed et al. | |
| 5,330,226 A | 7/1994 | Gentry et al. | |
| 5,404,128 A | 4/1995 | Ogino et al. | |
| 5,482,314 A | 1/1996 | Corrado et al. | |
| 5,602,734 A | 2/1997 | Kithil | |
| 5,607,180 A | 3/1997 | Kornhauser | |
| 5,653,462 A | 8/1997 | Breed et al. | |
| 5,691,693 A | 11/1997 | Kithil | |
| 5,724,024 A | 3/1998 | Sonderegger et al. | |
| 5,732,375 A | 3/1998 | Cashier | |
| 5,770,997 A | 6/1998 | Kleinberg et al. | |
| 5,772,238 A | 6/1998 | Breed et al. | |
| 5,802,479 A | 9/1998 | Kithil et al. | |
| 5,808,552 A | 9/1998 | Wiley et al. | |
| 5,809,437 A | 9/1998 | Breed | |
| 5,822,707 A | 10/1998 | Breed et al. | |
| 5,829,782 A | 11/1998 | Breed et al. | |
| 5,844,415 A | 12/1998 | Gershenfeld et al. | |
| 5,848,802 A | 12/1998 | Breed et al. | |

(Continued)

FOREIGN PATENT DOCUMENTS

DE    38 02 159 A1    8/1989

(Continued)

OTHER PUBLICATIONS

Breed, "A Smart Airbag System", 6th International Technical Conference on the Enhanced Safety of Vehicles (ESV), Windsor, Ontario, Canada, May 31-Jun. 4, 1998.

(Continued)

*Primary Examiner*—Tai Nguyen
(74) *Attorney, Agent, or Firm*—Brinks Hofer Gilson & Lione

(57) ABSTRACT

A vehicle occupancy sensing system provides a mechanism for determining whether a child is present in a vehicle. The sensing system may determine that an occupied front or rear facing child seat is present in an automobile, for example. To that end, the sensing system may employ a reliable electrode sensing system that may be conveniently installed in one or more locations in the vehicle seats. The sensing system thereby helps reduce occurrences of the potentially devastating consequences of unintentionally leaving a child in a vehicle.

56 Claims, 6 Drawing Sheets

U.S. PATENT DOCUMENTS

| | | | |
|---|---|---|---|
| 5,878,620 A | 3/1999 | Gilbert et al. | |
| 5,901,978 A | 5/1999 | Breed et al. | |
| 5,914,610 A | 6/1999 | Gershenfeld et al. | |
| 5,943,295 A | 8/1999 | Varga et al. | |
| 5,948,031 A | 9/1999 | Jinno et al. | |
| 5,954,360 A | 9/1999 | Griggs, III et al. | 280/735 |
| 6,012,007 A | 1/2000 | Fortune et al. | |
| 6,014,602 A | 1/2000 | Kithil et al. | |
| 6,020,812 A | 2/2000 | Thompson et al. | |
| 6,039,139 A | 3/2000 | Breed et al. | |
| 6,043,743 A * | 3/2000 | Saito et al. | 340/562 |
| 6,051,981 A | 4/2000 | Gershenfeld et al. | 324/663 |
| 6,066,954 A * | 5/2000 | Gershenfeld et al. | 324/671 |
| 6,078,854 A | 6/2000 | Breed et al. | |
| 6,081,757 A | 6/2000 | Breed et al. | |
| 6,088,640 A | 7/2000 | Breed | |
| 6,116,639 A | 9/2000 | Breed et al. | |
| 6,161,070 A | 12/2000 | Jinno et al. | 701/45 |
| 6,168,198 B1 | 1/2001 | Breed et al. | |
| 6,175,787 B1 | 1/2001 | Breed | |
| 6,179,326 B1 | 1/2001 | Breed et al. | |
| 6,186,537 B1 | 2/2001 | Breed et al. | |
| 6,242,701 B1 | 6/2001 | Breed et al. | |
| RE37,260 E | 7/2001 | Varga et al. | |
| 6,270,116 B1 | 8/2001 | Breed et al. | |
| 6,283,503 B1 | 9/2001 | Breed et al. | |
| 6,325,414 B1 | 12/2001 | Breed et al. | |
| 6,326,704 B1 | 12/2001 | Breed et al. | |
| 6,329,913 B1 | 12/2001 | Shieh et al. | 340/561 |
| 6,329,914 B1 | 12/2001 | Shieh et al. | 340/561 |
| 6,397,135 B1 | 5/2002 | Akita | |
| 6,397,136 B1 | 5/2002 | Breed et al. | |
| RE37,736 E | 6/2002 | Breed et al. | |
| 6,412,813 B1 | 7/2002 | Breed et al. | |
| 6,422,595 B1 | 7/2002 | Breed et al. | |
| 6,442,504 B1 | 8/2002 | Breed et al. | |
| 6,445,988 B1 | 9/2002 | Breed et al. | |
| 6,474,683 B1 | 11/2002 | Breet et al. | |
| 6,484,080 B1 | 11/2002 | Breed | |
| 6,513,830 B1 | 2/2003 | Breed et al. | |
| 6,513,833 B1 | 2/2003 | Breed et al. | |
| 6,517,106 B1 * | 2/2003 | Stanley et al. | 280/735 |
| 6,529,809 B1 | 3/2003 | Breed et al. | |
| 6,533,316 B1 | 3/2003 | Breed et al. | |
| 6,555,766 B1 | 4/2003 | Breed et al. | |
| 6,648,367 B1 | 11/2003 | Breed et al. | |
| 6,653,577 B1 | 11/2003 | Breed et al. | |
| 6,662,642 B1 | 12/2003 | Breed et al. | |
| 6,689,962 B1 | 2/2004 | Breed et al. | |
| 6,712,387 B1 | 3/2004 | Breed et al. | |
| 6,735,506 B1 | 5/2004 | Breed et al. | |
| 6,738,697 B1 | 5/2004 | Breed | |
| 6,746,078 B1 | 6/2004 | Breed | |
| 6,748,797 B1 | 6/2004 | Breed et al. | |
| 6,757,602 B1 | 6/2004 | Breed et al. | |
| 6,778,672 B1 | 8/2004 | Breed et al. | |
| 6,782,316 B1 | 8/2004 | Breed et al. | |
| 6,784,379 B1 | 8/2004 | Breed et al. | |
| 6,792,342 B1 | 9/2004 | Breed et al. | |
| 6,793,242 B1 | 9/2004 | Breed et al. | |
| 6,805,404 B1 | 10/2004 | Breed | |
| 6,820,897 B1 | 11/2004 | Breed et al. | |
| 6,833,516 B1 | 12/2004 | Breed et al. | |
| 6,850,824 B1 | 2/2005 | Breed | |
| 6,869,100 B1 | 3/2005 | Breed et al. | |
| 6,942,248 B1 | 9/2005 | Breed et al. | |
| 6,950,022 B1 | 9/2005 | Breed | |
| 6,958,451 B1 | 10/2005 | Breed et al. | |
| 2001/0029416 A1 | 10/2001 | Breed et al. | 701/45 |
| 2002/0089157 A1 | 7/2002 | Breed et al. | |
| 2002/0175490 A1 | 11/2002 | Sakai et al. | 701/45 |
| 2003/0001368 A1 | 1/2003 | Breed et al. | |
| 2003/0090376 A1 | 5/2003 | Thompson et al. | 340/541 |
| 2003/0204295 A1 | 10/2003 | Thompson et al. | 701/45 |
| 2004/0000992 A1 * | 1/2004 | Cuddihy et al. | 340/436 |

FOREIGN PATENT DOCUMENTS

| | | |
|---|---|---|
| DE | 3809074 A1 | 10/1989 |
| DE | 195 47 842 A1 | 6/1997 |

OTHER PUBLICATIONS

Breed et al, "A Critique of Single Point Sensing", SAE 920124, 12pp., International Congress & Exposition, Feb. 24-28, 1992.

Ian V. Lau, John D. Horsch, David C. Viano and Dennis V. Andrzejak, "Mechanism of Injury from Air Bag Deployment Loads", pp. 29-45, Accid. Anal. & Prev. vol. 25, No. 1, 1993.

David S. Breed and Vittorio Castelli, "Trends in Sensing Frontal Impacts", 16pp., SAE Technical Paper Series, International Congress & Exposition, Feb. 27 to Mar. 3, 1989.

R. Paul Gorman and Terrence J. Sejowski, "Learned Classification of Sonar Targets Using a Massively Parellel Network", pp. 1135-1140, IEEE Transactions on Acoustics Speech and Signal Processing, vol. 36, No. 7, Jul. 1998.

David S. Breed, Ph.D., "How Airbags Work (Design, Deployment Criteria, Costs, Perspectives)", 12pgs., Canadian Association of Road Safety Professionals International Conference on Airbags and Seatbelts: Evaluation and Implication for Public Safety, Oct. 19-20, 1992.

R. Paul Gorman and Terrence J. Sejnowski, "Analysis of Hidden Units in a Layered Network Trained to Classify Sonar Targets", pp. 75-89, Neutral Network, Vo. 1, 1988.

Jan A. Olsson, Lars-Gunnar Skötte and Sven-Erik Svensson, "Air Bag System for Side Impact Protection", pp. 976-983, Twelfth International Technical Conference on Experimental Saftety Vehicles, U.S. Department of Transportation, National Highway Traffic Safety Administration, Proceedings vol. 2, May 29 to Jun. 1, 1989.

Collision Safety Engineering, Proposal, Small Business Innovative Research, Crash Protection Accessories Using Inflated Structures, pp. 6-23, May 1987.

Thomas G. Zimmerman, et al., "Applying Electric Field Sensing to Human-Computer Interfaces" (8 pages) (Oct. 6, 1994).

Joseph A. Paradisco and Neil Fershenfeld, "Musical Applications of Electric Field Sensing", Oct. 1995; pp. 1-25.

National Highway Traffic Safety Administration; Aug. 4, 1998; vol. No. 63, No. 149.

Kazunori Jinno, "Occupant Sensing Utilizing Perturbution of Electric Fields", Feb. 1997; pp. 117-129.

J.R. Smith, "Field Mice: Extracting Hand Geometry From Electric Field Measurements", 1996; pp. 587-608.

Leonard M. Magid, "Electromagnetic Fields, Energy and Waves," p. 26 (1992).

Federal Motor Vehicle Safety Standards, Occupant Crash Protection, Notice 1.

European Search Report dated May 9, 2005.

* cited by examiner

VEHICLE OCCUPANT SENSING SYSTEM

BACKGROUND

1. Technical Field

The present invention relates to vehicle occupant sensing. More specifically, the present invention relates to automatic detection of the presence of an occupant on a vehicle seat and occupant characteristics such as age or facing, with a special focus on detecting children in child safety restraint devices, such as safety seats.

2. Background Information

Child safety has always been an important societal focus. In recent years, for example, great progress has been made in the design of child safety seats for automobiles. In fact, in many instances, hospitals require new parents to have a properly configured child safety seat waiting in their car before they can even take their own child home.

The child safety seat does not protect the child from all dangers, however. In particular, when young children are left unattended in an automobile, the consequences can be tragic. Each year, multiple children suffocate because they were left unintentionally in the back seat of a car, minivan, or other vehicle.

While several passenger detection systems have been proposed for controlling air bag activation, they have not been entirely suitable for widespread and cost effective implementation. For example, weight sensors may incorrectly detect or classify unusually light or heavy children. As another example, optical sensors are typically expensive and require complex optical processing equipment.

Thus, interest remains strong in overcoming the problems noted above and arriving at a reliable sensing system that may be conveniently installed in one or more locations in vehicle seats, and that is particularly adapted to detecting occupied child safety devices.

BRIEF SUMMARY

As an introduction, the occupant sensing systems described below are adept at determining whether an occupied or unoccupied child restraint device (e.g., a child safety seat) is present on a vehicle seat. In addition, in some implementations, the occupant sensors may determine additional characteristics about the restraint device, including its facing (e.g., either front facing or rear facing), and an approximate age of a child occupying the restraint device. In the same or other implementations, the sensors determine characteristics of occupants free of any child safety seat.

To that end, systems consistent with the present invention implement a vehicle occupancy sensing system. The sensing systems may include a first electrode connection and a second electrode connection. A circuit parameter sensor operates in conjunction with a controller to provide a first parameter reading for the first electrode connection, and a second parameter reading for the second electrode connection. The controller determines occupant presence based, for example, on a ratio or product of the first and second parameter readings and a pre-selected threshold.

In another implementation, three or more electrodes are positioned in a seat. One of the electrodes is non-switchably connected to virtual or relative ground. The remaining electrodes are used to sense an occupant or characteristics of the occupant.

DETAILED DESCRIPTION

The discussion below presents exemplary implementations of an occupant sensing system. The discussion is therefore not limiting, but explanatory in nature. The occupant sensing systems generally incorporate capacitive arrangements of multiple electrodes driven by a signal source, with a controller that interprets resultant loading or received current readings. In this regard, the sensing systems may employ the circuits and techniques described in U.S. Pat. No. 6,329,913, U.S. Pat. No. 6,329,914, or U.S. Pat. Pub. No. 2003-0090376 (application Ser. No. 10/033,585). The '913 patent, '914 patent, and the '585 application are incorporated herein by reference in their entireties. Sensing systems using capacitive bridges, phase detection, capacitance measurement, frequency changes or other techniques for detection with transmitted signals may be used.

Figure 1:
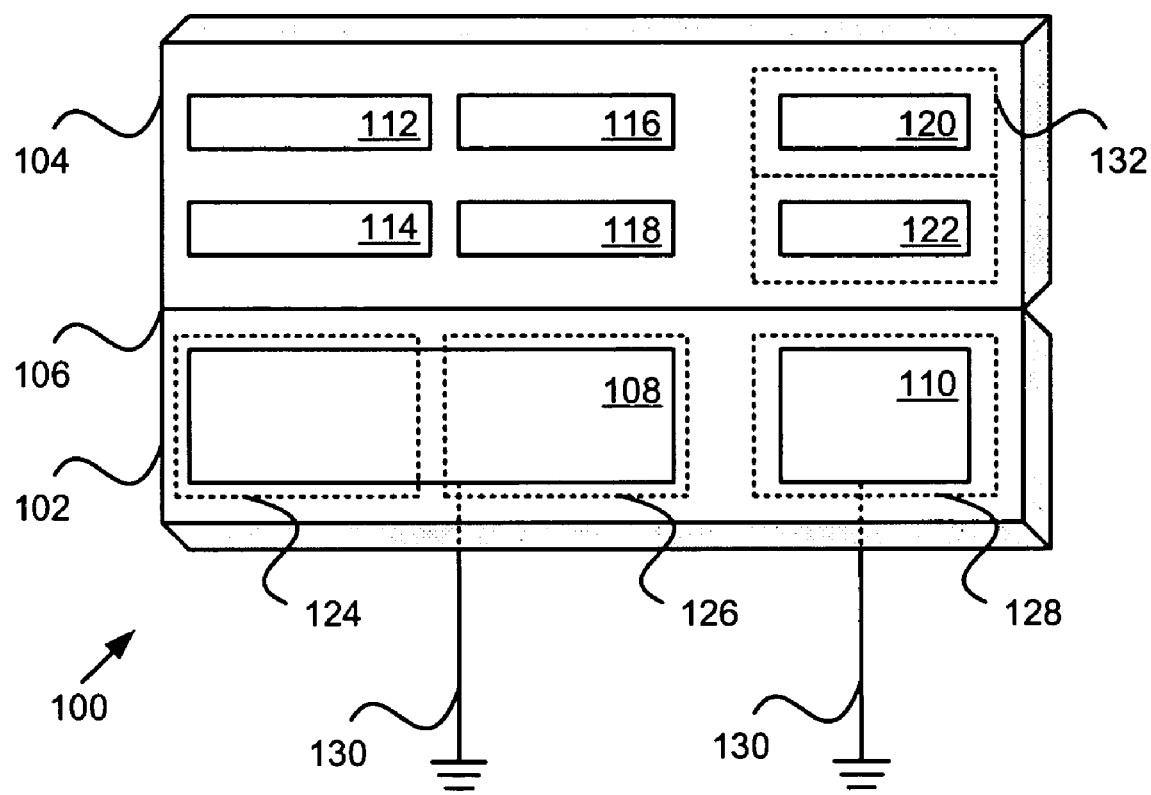
FIG. 1 illustrates a vehicle seat that incorporates electrodes that operate in conjunction with an occupant sensing system of one embodiment.

With regard to first to FIG. 1, that figure shows a vehicle seat 100. Although FIG. 1 illustrates the vehicle seat 100 as a longer bench seat (e.g., particularly suited for a minivan), the vehicle seat 100 may be a shorter seat, including a front or rear single passenger seat. The seat 100 includes a seat base 102, a seat back 104, and a seat bite 106 where the seat base 102 meets the seat back 104.

Ground electrodes 108 and 110 are present inside or on the seat 100. As shown, the ground electrodes 108 and 110 are placed in the seat base 102, but may be positioned in the seat back 104 in other embodiments. Furthermore, signal electrodes 112, 114, 116, 118, 120, and 122 are also present in pairs in the seat 100. The electrode pairs are disposed across the seating positions 124, 126, and 128. The seating positions 124–128 may correspond, for example, to lawful placement positions for a child safety seat on the seat 100. In other embodiments, two or more electrodes in the seat back extend across multiple seating positions.

Any of the electrodes 112–122 may be separated by at least a vehicle cabin feature distance. For example, the electrodes 112–122 may be separated by the largest dimension of a seat belt buckle, in order to prevent the seat belt buckle from shorting the two elements or interfering with electrical operation of the signal electrodes 112–122. Other cabin features may also be taken into consideration, for example, the largest dimension of a radio or DVD remote control, or the like, may influence the electrode 112–122 separation. In one embodiment, the upper and lower electrodes (e.g., 112, 114) are separated by approximately 25 to 50 mm.

The electrode pair 112 and 114, in conjunction with the ground plane 108, form one sensing position on the seat. Similarly, the electrode pair 116 and 118, in conjunction with the ground plane 110 form a second sensing position on the seat. Although the ground plane 108 may span multiple sensing positions, a separate ground plane may support any given sensing position. As an example, the electrode pair 120 and 122 operate in conjunction with the separate ground plane 110 to form a third sensing position for the seat 100.

In one implementation, the ground planes 108, 110 are connected to the vehicle chassis ground 130. While the ground planes 108, 110 may be connected permanently through non-switchable connections (as shown in FIG. 1) to the chassis ground, the ground planes 108, 110 may also be connected to a switch matrix that allows them to disconnect from the chassis ground and take the role of a signal electrode. Note that the ground planes 108, 110 or signal electrodes 112–122 may be slotted, cut, or otherwise shaped to impart additional flexibility or breathability for the seat 100.

The ground planes 108, 110 or signal electrodes 112–122 may be formed, for example, from a conductively coated sheet of polyester disposed in the seat 100. The conductive coating may include a layer of Nickel, a layer of Copper, and a layer of Nickel to protect the copper from corrosion. In other implementations, conductive paint, tape, or sewn metal fibers may form the ground planes 108, 110 and signal electrodes 112–122.

The size, orientation, and relative position of the ground planes 108, 110 and signal electrodes 112–122 may vary according to the design of the seat 100, or in response to empirical studies of occupied and unoccupied child restraint devices. Consequently, in one implementation, the signal electrodes 112–122 are shaped to fit in the sewing line groves 132 of the seat 100.

In one implementation, the electrode 122 may be 280 mm wide and 220 mm high, and may be located 140 mm above the seat bite 106. The electrode 120 may then be 280 mm wide and 200 mm high, and may be located 30 mm above the electrode 122. The ground plane 110 may be 450 mm wide and 320 mm long, and may be located 140 mm in front of the seat bite 106. Other sizes, shapes, positions, and orientations for the electrodes 112–122 are also suitable however.

Figure 2:
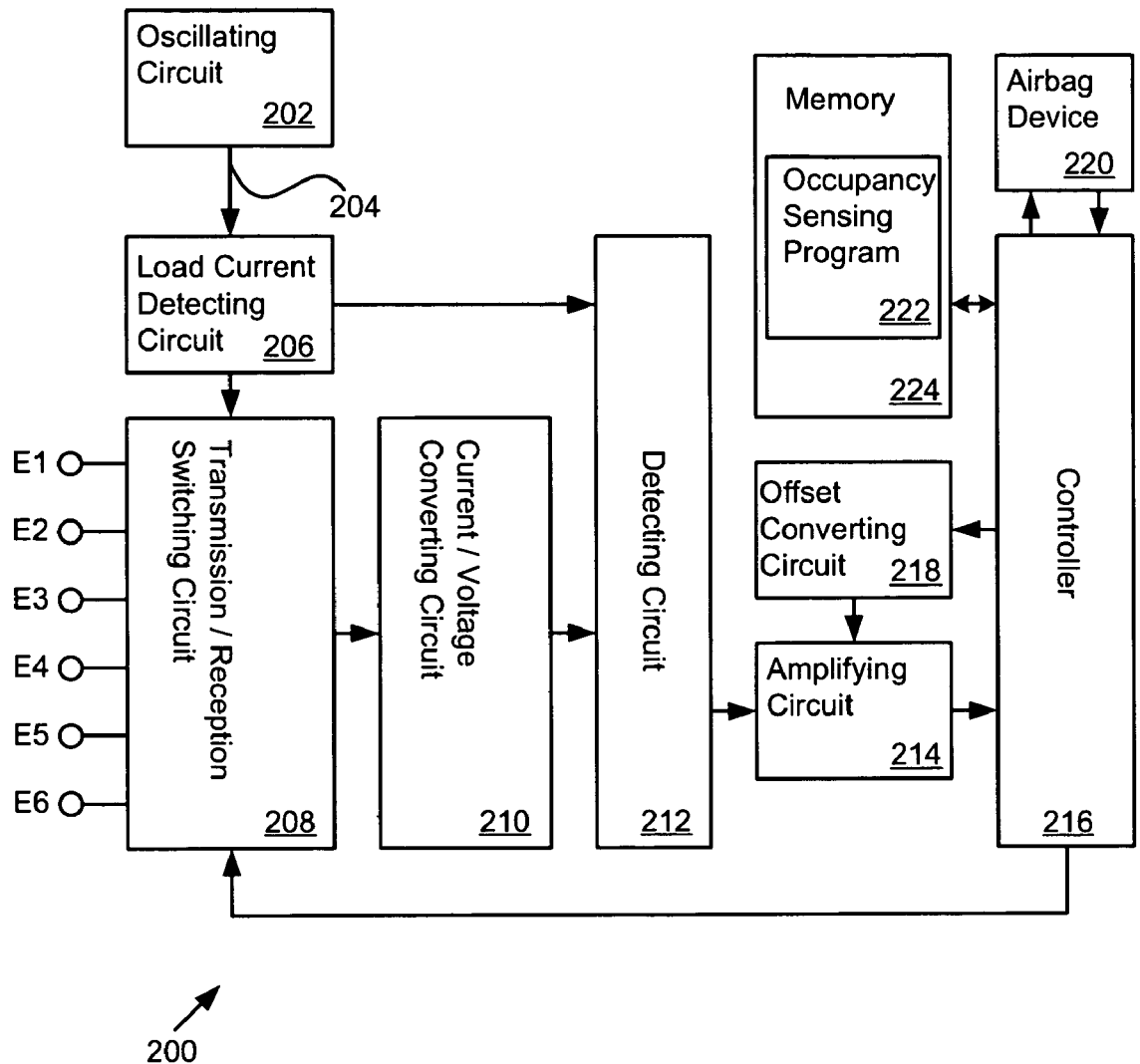
FIG. 2 shows one embodiment of a block diagram of an occupant sensing system.

Turning next to FIG. 2, that figure shows a block diagram of an occupant sensing system 200 that may be part of a larger vehicle electronics system. The occupant sensing system 200 includes a signal source 202 that presents a signal on a detection signal output 204 to a load sensor 206. The load sensor 206 connects to a switching circuit 208 that connects or disconnects the detection signal output 204 (and therefore the signal source 202) to one or more electrode connections E1, E2, E3, E4, E5, and E6.

The switching circuit 208 connects the electrode connections E1–E6 to the current-to-voltage conversion circuit 210. Both the conversion circuit 210 and the load sensor 206 connect to the detecting circuit 212. The load sensor 206 and/or the converting circuit 210 may generally be considered circuit parameter sensors. Accordingly, in one implementation, the load sensor 206 provides a voltage or current output indicative of load current flowing from the signal source 202 through the electrode connections E1–E6. Similarly, the converting circuit 210 provides a voltage or current output indicative of return current arriving through the electrode connections E1–E6, regardless of origin. While the discussion below proceeds with regard to current and voltage sensing, the sensing system 200 may alternatively or additionally employ a wide variety of circuit parameter sensors that measure, as examples, capacitance, phase, frequency, or Q, or that measure combinations of such circuit parameters.

The detecting circuit 212, in turn, connects to an amplification circuit 214 connected to the controller 216. The controller 216 applies controls signals to the offset converting circuit 218, and to the air bag device 220 or a warning device. The controller 216 may operate under control of an occupancy sensing program 222 stored in a memory 224. Consequently, the controller 216 may operate as explained below to determine whether any of the seating positions 124–128 are occupied and, optionally, one or more characteristics of the occupant.

Example implementations for the sensing system 200 are described in detail below, and in conjunction with FIG. 3. Other circuits may be substituted, or circuit parameters modified, however, depending on the particular implementation desired.

In one implementation, the signal source 202 may be a 100–120 kHz oscillator that outputs a 10–12 volt signal on the detection signal output 204. The switching circuit 208 may incorporate a multiplexer, switches or other devices that selectively connect the electrodes E1–E6 to the signal source 202.

The conversion circuit 210 includes a resistor network and generates voltage signals indicative of the current returning from or transmitting from the electrode connections E1–E6 through the switching circuit 208. The conversion circuit 210 may also amplify the voltage signals before outputting them to the detection circuit 212. The detection circuit 212 may include a demodulation circuit including a band pass filter that eliminates noise coupled to an AC-DC converter to provide a DC signal output to the converting circuit 210.

The controller 216 may be an ASIC, processor, digital signal processor or other circuitry for evaluating the signals obtained from the amplifying circuit 214. The controller 216 may be a PD78052CG(A) microprocessor manufactured by NEC Corporation of Japan that substitutes its own AC-DC conversion circuitry for that noted above in the detection circuit 212. The controller 216, after evaluating the signals, may set an occupancy indicator that specifies whether a particular seating position is occupied. The occupancy indicator may be an internal register or memory setting, or may be an external indicator such as a warning lamp, dashboard indicator, speaker alarm, voice prompt, or another indicator.

Figure 3:
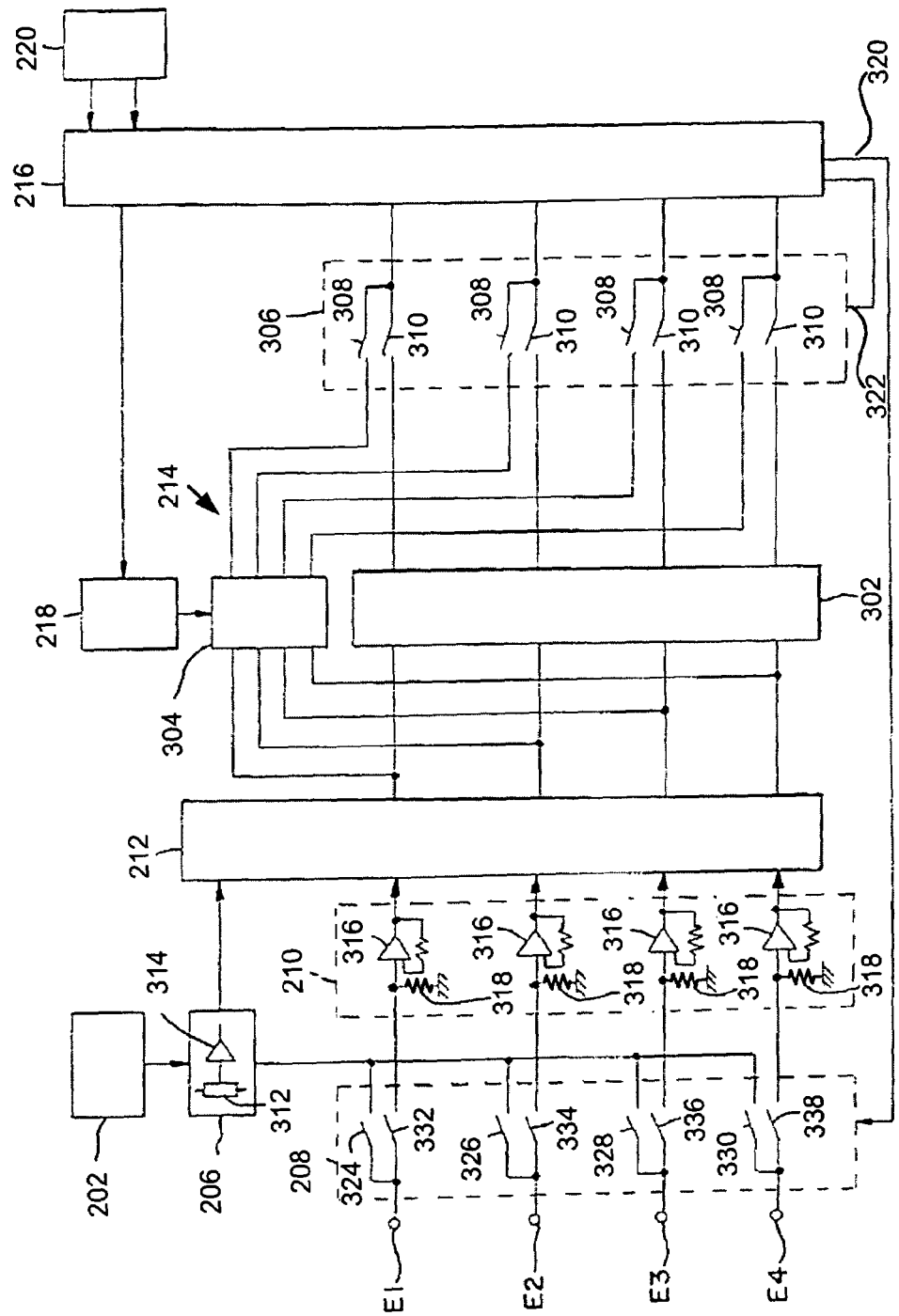
FIG. 3 shows a detailed view of the occupant sensing system shown in FIG. 2.

FIG. 3 is a circuit diagram 300 that shows the occupant sensing system 200 in additional detail. While four channels are shown (E1–E4), the circuitry shown in FIG. 3 may be extended to more channels (e.g., 6 channels E1–E6) by replicating the sensing and detection circuitry described below. In other implementations, the sensing system 200 may use fewer channels, such as where connected with a single passenger seat, or on a larger multiple passenger seat for which fewer sensing positions are desirable. Note also that the sensing system 200 may determine occupant presence across multiple physically separate seats. The circuitry 300 connects to the six electrodes 112–122 to provide occupancy sensing across multiple positions in the seat 100. The controller 216 may then scan across the seat sequentially or at random to determine whether the sensors for any seating position 124–128 indicate that an occupant is present or a characteristic of the occupant.

As shown, the amplification circuit 214 includes a relatively low gain (e.g., a gain of approximately 1) amplifier 302 and a relatively high gain (e.g., a gain of approximately 100) amplifier 304. An analog switch 306 selectively connects the outputs of the low gain amplifier 302 or the high gain amplifier 304 to the controller 216 through the switching elements 308 and 310 as directed by the controller 216.

The load sensor 206 may be implemented as an impedance/resistance element 312 and an amplifier 314 connected between the signal source 202 and the switching circuit 208. The load sensor 206 thereby provides a voltage signal to the detection circuit 212 that indicates the amount of current flowing to the switching circuit 208 (and thus to one of the electrodes 112–122).

The switching circuit 208 includes switching elements 324, 326, 328, and 330 and switching elements 332, 334, 336, and 338. The switching elements 324–330 selectively connect, in response to a control signal 320 from the controller 216, an electrode connection E1–E4 to the signal source 202. The signal source 202 thereby drives the electrode connected to the electrode connection E1–E4. The load sensor 206 responsively measures the load current flowing to the electrode, with respect to the ground planes 108–110 and other grounding provided through any occupant to the vehicle. The controller 216 may open or close the switches 332–338 in order to obtain measurements of return currents present in the remaining electrodes. In other words, in alternative embodiments, the load sensor 206, the converting circuit 210, or other circuit parameter sensors measure parameters associated with electrodes different from the electrode used to transmit.

The converting circuit 210 may include an impedance/resistance element 318 that converts current flowing in the receiver electrodes to voltage signals, and an amplifier 316 that amplifies the converted voltage signals. The impedance/resistance elements 318 shunts high frequency noise from the input of the amplifier 316 to ground.

The detecting circuit 212 may include an impedance or resistance element and a differential amplifier (or other amplifier) whose output is coupled to the controller 216 through the amplifier circuit 214. One such impedance/resistance element may be connected between the output of an amplification control circuit and the electrode connections E1–E4. The differential amplifier may be connected across the impedance/resistance element to generate a current signal based on the voltage differential across the impedance/resistance element. In particular, the current differential amplifier compares the voltage level of the oscillation circuit output signal with the voltage level generated on an electrode, and generates a current signal representative of the difference.

The detecting circuit 212 thereby receives the output signal from the load sensor 206 as well as the signals from the receiving electrodes and couples them to the high gain amplifier 304 and the low gain amplifier 302. The high gain amplified outputs couple to the switches 308, while the low gain amplified outputs couple to the switches 310. In response to the control signal 322, the analog switch 306 couples either the high gain or low gain output to input pins on the controller 216.

Figure 4:
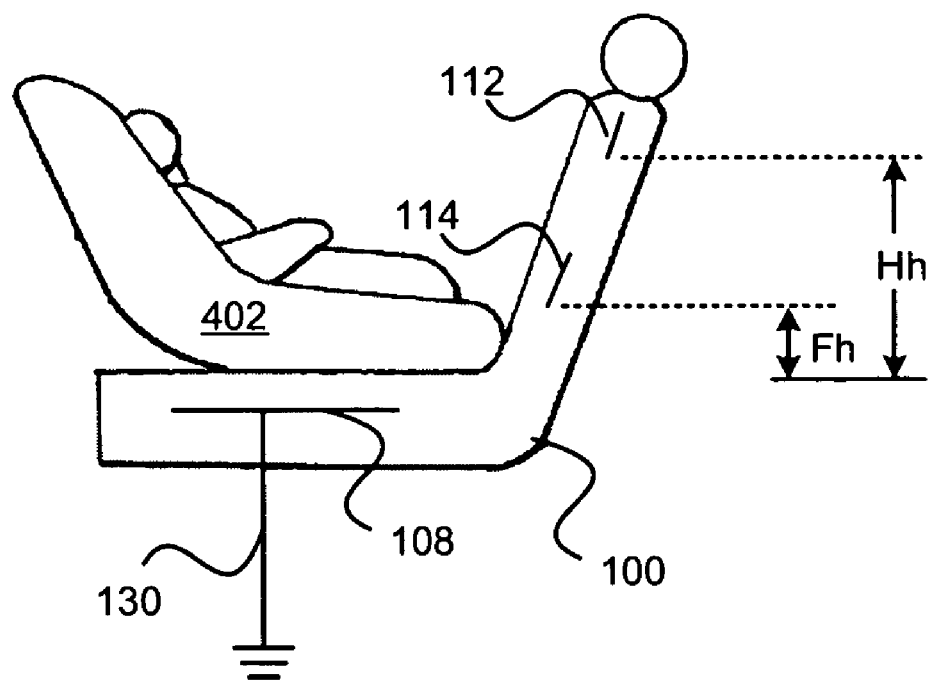
FIG. 4 shows a diagram of seat electrode positioning with respect to a front facing and a rear facing child safety seat in one embodiment.
Figure 4:
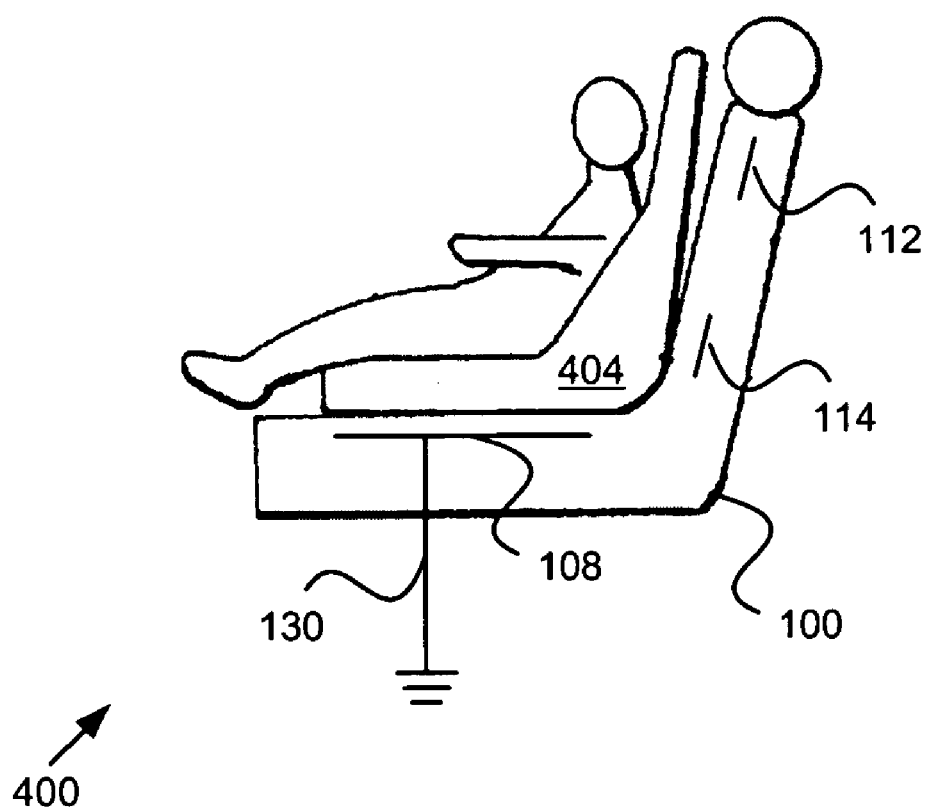

With regard next to FIG. 4, that figure shows a sensor configuration 400 adapted to determine whether the seat 100 is occupied. More specifically the sensor configuration 400 may determine whether an occupied or unoccupied child safety seat is present. The child safety seat may be a rear facing child safety seat 402 or a front facing child safety seat 404.

As noted above, the seat 100 includes an electrode pair 112, 114, and a ground plane 108. The first electrode 112 is disposed in the seat 100 as an upper body electrode. In this case, the upper body electrode is a head electrode disposed at a pre-selected head height, Hh, for an occupied child safety seat.

The second electrode 114 is disposed in the seat 100 as a lower body electrode. In one embodiment, the lower body electrode is a foot electrode disposed at a pre-selected foot height, Fh, for an occupied child safety seat. The electrode heights may be empirically determined through examination, measurement, and testing of multiple models of child safety seats, in conjunction with statistical data (e.g., dimensional measurements) of young children that occupy such safety seats. Although other heights are suitable, in one implementation, the height Fh is approximately 140 mm above the seat bite 106, while the height Hh is approximately 390 mm above the seat bite 106.

The head electrode 112 may be connected to the sensing system 200 through an electrode connection E1–E6. As an example, the electrode connection E1 may serve as a seat back head electrode connection. Similarly, the electrode connection E2 may serve as a seat back foot electrode connection. In conjunction with the ground electrode 108, the head electrode 112 and foot electrode 114 form an electric field sensing circuit.

The controller 216 may determine occupant presence or absence in many ways. For example, the controller 216 may measure the loading current, HL, to the head electrode 112 and the loading current, FL, to the foot electrode 112. Then, the controller may apply an occupancy test according to HL<T1 and FL<T2, where T1 and T2 are pre-determined thresholds based on prior studies of occupied and unoccupied child safety seats. If HL<T1 and FL<T2, then the controller 216 may determine that no occupant is present on the seat 100. In one implementation, T1 and T2 may be approximately 6 bits, although other threshold settings may also be suitable based on the particular design.

If, however, the controller 216 determines that an occupant is present, the controller 216 may apply additional occupancy tests. For example, the controller 216 may next determine whether FL−HL<T3 and (FL/HL)<T4, where T3 and the ratio threshold T4 are pre-determined thresholds based on prior studies of occupied and unoccupied child safety seats. Thus, when the foot electrode load current is greater than the head electrode load current (e.g., when the child's feet are closer to the foot electrode 114 than the head is to the heat electrode 112), and when their ratio is less than a threshold, the controller 216 may determine that a rear facing child safety seat 402 is present. For the purposes of this occupancy test, T3 may be approximately zero bits, while T4 may be approximately 1. Other thresholds may be employed, however.

Similarly, the controller 216 may determine whether FL−HL>T5 and (HL/FL)>T6, where T5 and the ratio threshold T6 are pre-determined thresholds based on prior studies of occupied and unoccupied child safety seats. The test succeeds when an occupied front facing child safety seat is present in the seat 100. While other thresholds may be used, the threshold T5 may be approximately zero bits, while the threshold T6 may be approximately 1.

Note that the thresholds may also be determined by empirical study not only of an occupied or unoccupied child safety seat, but also according to age of the occupant. Thus, empirical studies may be undertaken to obtain characteristic thresholds for children of one or more ages (e.g., 1 year old, and 3 years old) that occupy front or rear facing child safety seats or the seats without child safety seats. For that reason, the controller 216 may repeat the occupancy tests noted above with different thresholds, in order to obtain an age estimation for the occupant based on the load current readings.

In another implementation, the controller 216 determines occupant presence based on a product of loading current readings with regard to one or more thresholds. As one example, the controller 216 may sample and store unloaded (e.g., no occupant) current measurements for the head electrode 112 and the foot electrode 114. Then, the controller 216 may determine a sum that represents the total load impact on both the head electrode 112 and the foot electrode 114. The load impact is the difference between the unloaded condition (e.g., no occupant), and measurements taken to determine a loaded condition (e.g., with occupant). Similarly, the controller 216 may also determine a difference that represents the difference in load impact between the head electrode 112 and the foot electrode 114.

The controller 216 then forms the product of the sum and the difference. In conjunction with one or more thresholds, the controller may then determine whether the seat 100 is occupied.

Figure 5:
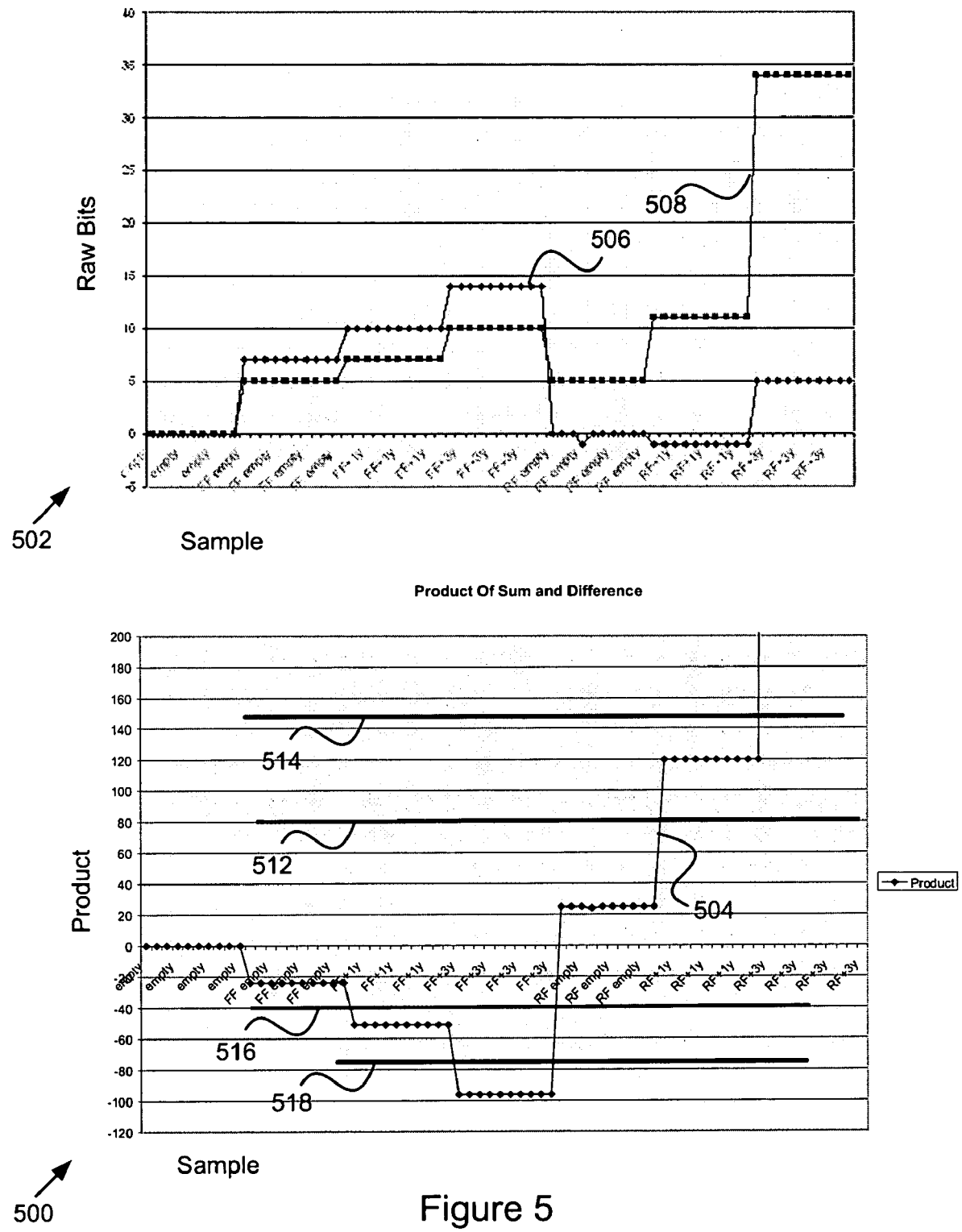
FIG. 5 shows a diagram of one embodiment of an occupancy test in which a product of loading currents is compared against an upper threshold and a lower threshold.

For example, FIG. 5 shows a diagram of an occupancy test 500 based on loading currents 502 and a product of the loading currents 504. The loading currents 502 include the head electrode loading current 506, and the foot electrode loading current 508. FIG. 5 shows the loading currents 506, 508 measured in terms of raw bits across multiple samples. The loading currents 506, 508 change in response to the presence or absence of child safety seats on the seat 100.

The occupancy test 500 includes a product of loading currents 504 compared against upper thresholds 512 and 514, and lower thresholds 516 and 518. As explained below, the thresholds 512–518 may distinguish between occupant age, but, in alternative embodiments, the thresholds may instead distinguish between other occupant characteristics. The thresholds 512–518 may be empirically determined according to studies of occupied and unoccupied child safety seats.

More specifically, the product 504 is a product of the sum and the difference of load impact explained above. When the product 504 crosses a product threshold, the controller 216 accordingly determines that the seat 100 is occupied, and optionally determines additional occupant characteristics. For example, when the product 504 crosses the upper threshold 512, the controller 216 may determine that the seat 100 holds an occupied rear facing child safety seat with a 1–3 year old child. If the product 504 further crosses the upper threshold 514, the controller 216 may determine that the occupant is approximately 3 years old. If the product 504 crosses the threshold 512 but not the threshold 514, the controller 216 may determine that the occupant is approximately 1 year old.

Similarly, when the product 504 crosses the lower threshold 516, the controller 216 may determine that the seat 100 holds an occupied front facing child safety seat with a 1–3 year old child. If the product 504 further crosses the lower threshold 518, the controller 216 may determine that the occupant is approximately 3 years old. If the product 504 crosses the lower threshold 516 but not the lower threshold 518, the controller 216 may determine that the occupant is approximately 1 year old.

The controller 216 performs the occupancy tests noted above using the circuitry 300 shown in FIG. 3, optionally expanded to include six channel connections E1–E6. The signal electrodes 112, 116, and 120 may therefore correspond to head electrodes connected to the electrode connections E1, E3, and E5, for example. The signal electrodes 114, 118, and 122 may then be foot electrodes that may be connected to the electrode connections E2, E4, and E6. The loading currents are sensed with respect to the ground plane 108 for the signal electrodes 112–118 and with respect to the ground plane 110 for the signal electrodes 120–122.

When the controller 216 checks the seating position 124 for occupancy, the controller 216 may first assert the control signal 320 to couple the head electrode 112 to the signal source 202 through the switch 324 and electrode connection E1. The controller 216 then determines the head electrode load as sensed by the load sensor 206. Next, the controller 216 opens the switch 324 and closes the switch 326. As a result, the signal source 202 drives the foot electrode 114 through the electrode connection E2. The controller 216 may then monitor the foot electrode load as sensed by the load sensor 206. Alternatively, the controller 216 may measure circuit parameters, such as load current, by transmitting from one electrode and receiving at another.

The controller 216 thereby connects one electrode 112–122 at a time to the signal source 202. The remaining switches in the switch 208 remain open. However, in other embodiments, the controller 216 may close one or more switching elements 324–338 in the switch 208 to connect additional electrodes to the signal source 202 or to connect one or more electrodes to the converting circuit 210 and the detecting circuit 212. Thus, the currents present in multiple electrodes may contribute to the occupancy analysis.

Once the controller 216 has obtained the head and foot electrode loads for the seating position 124, the controller 216 may then proceed to perform the occupancy tests explained above. The controller 216 thereby arrives at an occupancy determination for the seating position 124. The occupancy determination may indicate a front facing or rear facing child safety seat, or an age approximation, as examples.

The controller 216 may proceed to check the additional seating positions 126 and 128 as well. Thus, with regard to the seating position 126, the controller 216 may connect the head electrode 116 to the signal source 202 through the switch 328 through the electrode connection E3, and obtain a head electrode load measurement for the seating position 126. The controller 216 may then disconnect the head electrode 116 from the signal source, and connect the foot electrode 118 to the signal source 202 through the switch 330 and the electrode connection E4. After obtaining the foot electrode load measurement, the controller 216 may apply an occupancy test to determine whether the seating position 126 has an occupant.

Similarly, the controller 216 may then check the seating position 128 for occupancy. To that end, the controller 216 may connect the head electrode 120 to the signal source 202 through the electrode connection E5. After obtaining a head electrode load measurement, the controller 216 may then connect the foot electrode 122 to the signal source 202 through the foot electrode connection E6. A foot electrode load measurement results. The controller 216 then applies an occupancy test to determine whether the seating position 128 has an occupant.

The controller 216 may determine which occupancy test to apply in many ways. For example, the controller 216 may be pre-configured to employ the product or ratio test first unless the result are inconclusive, then employ the remaining test. Alternatively, the controller 216 may employ both tests, select one at random, select one according to a pre-set parameter in the memory 224, or the like. In yet another alternative, the controller 216 may use a different function than the ratio or product, or may employ different formulations of a ratio or a product. Accordingly, the ratio or the product may include additional variables, including measured circuit parameters representative of additional electrodes. Alternatively, the ratio or product may be ratios or products of more than two variables, for example, a product of three or four circuit parameter measurements obtained from three or four different electrodes. Furthermore, the circuit parameter measurements included in the ratio or product may be arithmetic averages, modes, normalizations, or other forms of the circuit parameters measurements.

Figure 6:
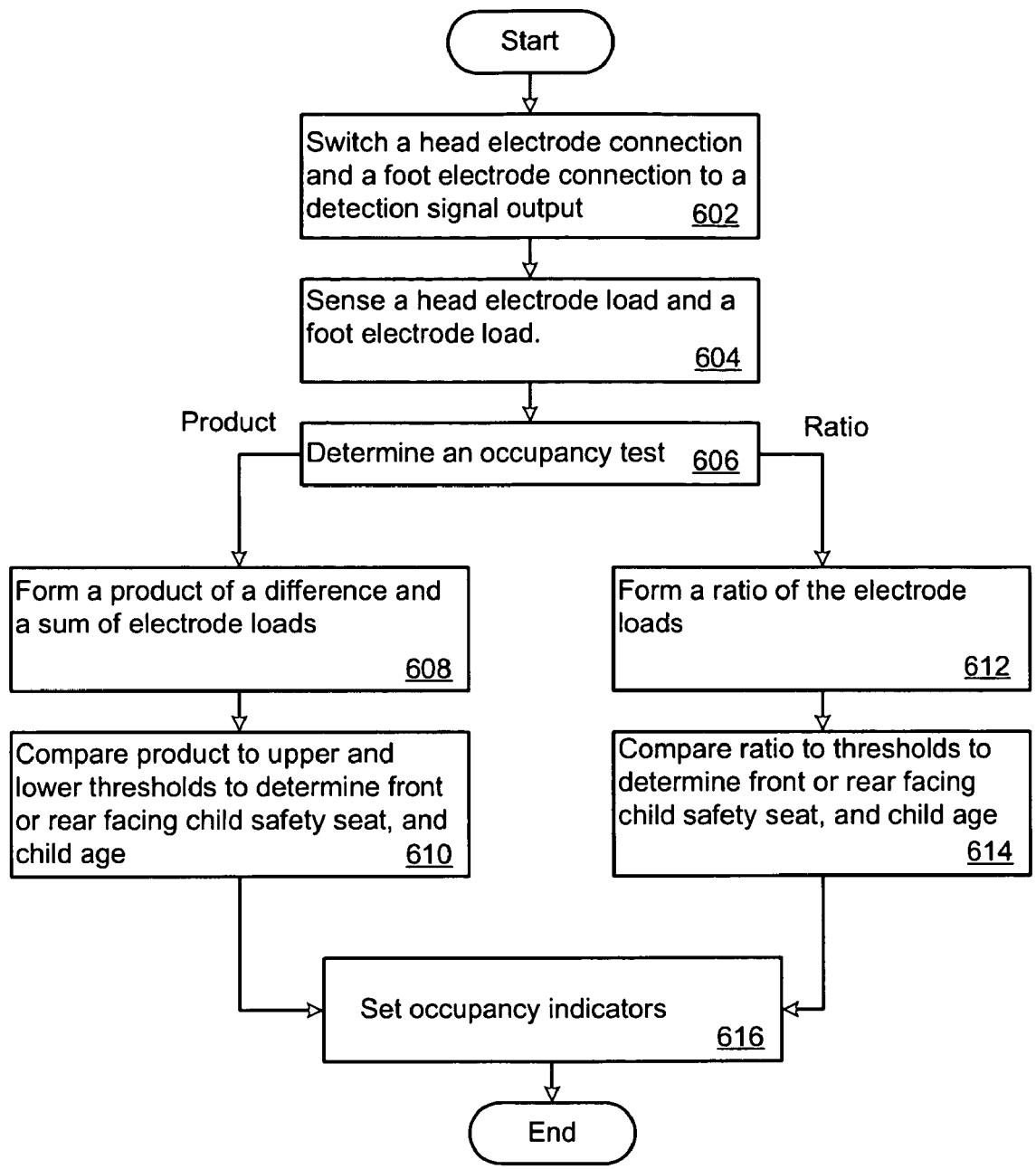
FIG. 6 shows a flow diagram one embodiment of the acts that the occupant sensing system shown in FIG. 2 or another system may take to determine occupant presence.

Turning next to FIG. 6, that figure presents a flow diagram of the acts that the occupant sensing system 100 may take to determine occupant presence. The controller 216 individually switches a head electrode connection and a foot electrode connection to a detection signal output (Act 602). The controller 216 then determines the head electrode load and a foot electrode load (Act 604). Given the head electrode and foot electrode loads, the controller 216 then determines an occupancy test to apply (Act 606).

When the controller 216 selects a load product occupancy test, the controller 216 proceeds as explained above to form a product of a difference and a sum of load impacts (Act 608). The controller 216 also compares the product to upper and lower thresholds to determine seat 100 occupancy, including a front or rear facing child safety seat, and optionally an age characteristic (Act 610).

On the other hand, when the controller 216 selects a ratio occupancy test, the controller 216 proceeds as explained above to form one or more ratios of the electrode loads (Act 612). Based on the result of comparisons against thresholds, the controller 216 may thereby determine vehicle occupancy, including a front or read facing child safety seat, and optionally age information (Act 614).

When the controller 216 determines that the seat 100 is occupied, the controller 216 may responsively set occupancy indicators in the vehicle (Act 616). Thus, for example, the controller 216 may illuminate a warning lamp on the dashboard. As another example, the controller 216 may issue a voice or sound alarm. As yet another example, the controller 216 outputs a signal to an air bag activation or control system, such as the airbag device 220, to disable airbag activation if appropriate.

The vehicle occupancy sensing system 200 provides a mechanism for determining whether a vehicle is occupied. The sensing system 200 may determine that an occupied front or rear facing child seat is present in an automobile and issue appropriate reminders, warnings, and the like. The sensing system 200 may thereby helps reduce occurrences of children unintentionally left in vehicles.

Either or both of the ratio and product occupancy tests may be based upon parameter readings (e.g., load current) for a single upper body electrode (e.g., electrode 120) and a single lower body electrode (e.g., electrode 122). For example, the ratio (FL/HL) may be formed with respect to loading currents obtained solely from the head electrode 120 (HL) and solely from the foot electrode 122 (FL). Alternatively, either of the ratio and product occupancy tests may employ parameter readings obtained over multiple electrodes. Thus, for example, the ratio (FL/HL) may be formed with respect to loading currents obtained from two or more of the electrodes 108–122. For example, the parameter reading HL may be determined from a combination of parameters associated with any two or three of the head electrodes 112, 116, and 120, while the parameter reading FL may be determined from a combination of parameters associated with any two or three of the foot electrodes 114, 118, and 122.

Furthermore, the product and ratio approaches explained above exemplary approaches that may be taken to determine occupant presence or occupant characteristics. For that reason, alternative tests may be employed, including modified, derivative, or alternate forms of the ratio and product tests. As examples, the product and ratio tests may both be evaluated to determine if they are in agreement, may be extended to include additional variables (e.g., parameter readings other than load current) and functions (such as differences) of the variables, or may be extended to evaluate contributing effects of multiple electrodes or combinations of electrodes or to incorporate readings obtained from humidity, temperature, or other types of sensors.

The occupant sensing system 200 determines occupancy characteristics. Thus, in the manner explained above, the sensing system 200 may determine any of occupant presence, occupant facing, and occupant age. The sensing system 200 may, however, be extended to determine additional occupancy characteristics. Thus, for example, the sensing system 200 may be employed to determine occupant size, weight, or other characteristics.

It is therefore intended that the foregoing detailed description be regarded as illustrative rather than limiting, and that it be understood that it is the following claims, including all equivalents, that are intended to define the spirit and scope of this invention.

The invention claimed is:

1. A vehicle occupancy sensing system comprising:
   a first electrode connection and a second electrode connection;
   a circuit parameter sensor connected with the first electrode connection and the second electrode connection; and
   a controller coupled to the circuit parameter sensor, the controller operable to obtain a first parameter reading for the first electrode connection and a second parameter reading for the second electrode connection, and operable to determine an occupancy characteristic based on a product of load impacts determined based on the first and second parameter readings with respect to a first unloaded electrode connection reading and a second unloaded electrode connection reading.

2. The vehicle occupancy sensing system of claim 1, where the first electrode connection is a head electrode connection.

3. The vehicle occupancy sensing system of claim 2, further comprising a head electrode coupled to the head electrode connection.

4. The vehicle occupancy sensing system of claim 3, where the head electrode is disposed at a pre-selected head height for a child in a child safety seat.

5. The vehicle occupancy sensing system of claim 1, where the second electrode connection is a foot electrode connection.

6. The vehicle occupancy sensing system of claim 5, further comprising a foot electrode coupled to the foot electrode connection.

7. The vehicle occupancy sensing system of claim 6, where the foot electrode is disposed at a pre-selected foot height for a child in a child safety seat.

8. The vehicle occupancy sensing system of claim 1, further comprising a non-switchable return ground connection.

9. The vehicle occupancy sensing system of claim 8, further comprising a return ground electrode coupled to the return ground connection, the ground electrode forming a capacitive sensing circuit in conjunction with at least one electrode coupled to at least one of the first and second electrode connections.

10. The vehicle occupancy sensing system of claim 1, further comprising a first electrode coupled to the first electrode connection and a second electrode coupled to the second electrode connection, and wherein the first electrode and the second electrode are separated by at least a pre-selected vehicle cabin feature distance.

11. The vehicle occupancy sensing system of claim 10, where the vehicle cabin feature distance is a selected belt-buckle dimension.

12. The vehicle occupancy sensing system of claim 1, where the controller is further operable to negatively determine occupant presence by applying an occupancy test comprising:
HL<T1 and FL<T2,
where HL is the first load reading, FL is the second load reading, and T1 and T2 are pre-determined thresholds.

13. The vehicle occupancy sensing system of claim 1, where the controller is further operable to determine occupant presence as an occupied rear facing child safety seat by applying an occupancy test comprising:
FL−HL<T3 and (FL/HL)<T4,
where HL is the first load reading, FL is the second load reading, and T3 and T4 are pre-determined thresholds.

14. The vehicle occupancy sensing system of claim 1, where the controller is further operable to determine occupant presence as an occupied front facing child safety seat by applying an occupancy test comprising:
FL−HL>T5 and (HL/FL)>T6,
where HL is the first load reading, FL is the second load reading, and T5 and T6 are pre-determined thresholds.

15. The vehicle occupancy sensing system of claim 1, where the controller is further operable to obtain an occupant age estimation based on the first and second parameter readings.

16. The vehicle occupancy sensing system of claim 15, where the controller is operable to obtain the occupant age estimation by comparing at least one of the first and second parameter readings to an age threshold after determining the presence of a child safety seat.

17. The vehicle occupancy sensing system of claim 1, where the controller is further operable to disable air bag activation based on the determination of the occupancy characteristic.

18. The vehicle occupancy sensing system of claim 1, where at least one of the first and second parameter readings is a load current reading.

19. The vehicle occupancy sensing system of claim 1, where the load impacts comprises at least one of a load impact sum and a load impact difference.

20. The vehicle occupancy sensing system of claim 19, where the first parameter reading is a first load current reading and where the second parameter reading is a second load current reading.

21. The vehicle occupancy sensing system of claim 1, where the load impacts comprise a load impact sum and a load impact difference.

22. The vehicle occupancy sensing system of claim 1, where the controller is further operable to determine the occupancy characteristic based on an upper threshold and a lower threshold.

23. The vehicle occupancy sensing system of claim 1, where the controller is further operable to determine the occupancy characteristic based on multiple upper thresholds and multiple lower thresholds.

24. The vehicle occupancy sensing system of claim 23, where at least one of the thresholds comprises a front facing child seat threshold.

25. The vehicle occupancy sensing system of claim 23, where at least one of the thresholds comprises a rear facing child seat threshold.

26. A method for sensing vehicle occupancy comprising the acts of:
sensing a first parameter associated with a first electrode connection;
sensing a second parameter associated with a second electrode connection; and
determining a product of load impacts determined based on the first and second parameters with respect to a first unloaded electrode connection reading and a second unloaded electrode connection reading.

27. The method of claim 26, further comprising the act of comparing the product against at least one of an upper threshold and a lower threshold comprising an occupied child safety seat threshold.

28. The method of claim 27, where the upper threshold comprises a rear facing child seat threshold and where the lower threshold comprises a forward facing child seat threshold.

29. The method of claim 26, where sensing a first parameter comprises the act of sensing a first load through an upper body electrode coupled to the first electrode connection.

30. The method of claim 29, where the upper body electrode is disposed at a pre-selected upper body height for an occupied child restraint device.

31. The method of claim 26, where sensing a second parameter comprises the act of sensing a second load through a lower body electrode coupled to the second electrode connection.

32. The method of claim 31, where the lower body electrode is disposed at a pre-selected lower body height for an occupied child restraint device.

33. The method of claim 26, further comprising the act of comparing the product against at least one of a first upper threshold and a first lower threshold and against at least one of a second upper threshold and a second lower threshold.

34. The method of claim 33, where the first and second upper threshold are age distinguishing thresholds.

35. The method of claim 33, where the first and second lower thresholds are age distinguishing thresholds.

36. The method of claim 26, further comprising the act of setting a presence indicator when at least one of the product and the ratio crosses at least one threshold.

37. The method of claim 26, further comprising the act of disabling an airbag based on the comparing.

38. The method of claim 26, further comprising the act of applying an occupancy test comprising:
HL<T1 and FL<T2,
where HL is the first load reading, FL is the second load reading, and T1 and T2 are pre-determined thresholds.

39. The method of claim 26, further comprising the act of applying a rear facing child safety seat occupancy test comprising:
FL−HL<T3 and (FL/HL)<T4,
where HL is the first load reading, FL is the second load reading, and T3 and T3 are pre-determined thresholds.

40. The method of claim 26, further comprising the act of applying a front facing child safety seat occupancy test comprising:
FL−HL>T5 and (HL/FL)>T6, where HL is the first load reading, FL is the second load reading, and T5 and T6 are pre-determined thresholds.

41. The method of claim 26, where at least one of the first electrode connection and the second electrode connection is a head electrode connection.

42. The method of claim 26, where at least one of the first electrode connection and the second electrode connection is a foot electrode connection.

43. A machine readable medium encoded with instructions that cause a vehicle electronics system to perform a method comprising the acts of:
sensing a first parameter associated with a first electrode connection;
sensing a second parameter associated with a second electrode connection; and
determining a product of load impacts determined based on the first and second parameters with respect to a first unloaded electrode connection reading and a second unloaded electrode connection reading.

44. The machine readable medium of claim 43, further comprising the act of comparing the product against at least one of a first and second pre-selected threshold that is an occupied child safety seat threshold.

45. The machine readable medium of claim 44, where at least one of the first and second pre-selected thresholds is a forward facing child safety seat threshold.

46. The machine readable medium of claim 44, where at least one of the first and second pre-selected thresholds is a rear facing child safety seat threshold.

47. The machine readable medium of claim 43, where sensing a first load comprises sensing a first load through an upper body electrode coupled to the first electrode connection.

48. The machine readable medium of claim 47, where the upper body electrode is disposed at an upper body height for an occupied child restraint device.

49. The machine readable medium of claim 43, where sensing a second load comprises the act of sensing a second load through a lower body electrode coupled to the second electrode connection.

50. The machine readable medium of claim 49, where the lower body electrode is disposed at a lower body height for an occupied child restraint device.

51. A vehicle occupancy sensing system comprising:
a first electrode in a seat back;
a second electrode in the seat back;
a circuit parameter sensor connected with the first and second electrodes; and
a controller coupled to the circuit parameter sensor, the controller operable to obtain a first parameter reading for the first electrode and a second parameter reading for the second electrode, and operable to determine an occupancy characteristic based on a product of load impacts based on the first and second parameter readings with respect to a first unloaded electrode connection reading and a second unloaded electrode connection reading.

52. The vehicle occupancy sensing system of claim 51, where the product comprises the product of a load impact sum and a load impact difference.

53. The vehicle occupancy sensing system of claim 51, where the controller is further operable to compare the product against multiple age distinguishing thresholds.

54. The vehicle occupancy sensing system of claim 51, where at least one of the first and second parameter readings is a load current reading.

55. The vehicle occupancy sensing system of claim 51, where at least one of the electrodes is a head electrode disposed at an upper body height for an occupied child restraint device.

56. The vehicle occupancy sensing system of claim 51, where at least one of the electrodes is a foot electrode disposed at a lower body height for an occupied child restraint device.

* * * * *

UNITED STATES PATENT AND TRADEMARK OFFICE
CERTIFICATE OF CORRECTION

PATENT NO. : 7,151,452 B2 Page 1 of 1
APPLICATION NO. : 10/729655
DATED : December 19, 2006
INVENTOR(S) : Shiuh-An Shieh It is certified that error appears in the above-identified patent and that said Letters Patent is hereby corrected as shown below:

In the Claims

In column 11, claim 19, line 51, after "the load impacts" replace "comprises" with --comprise--.

Signed and Sealed this

Thirty-first Day of August, 2010

David J. Kappos
*Director of the United States Patent and Trademark Office*